(12) United States Patent
Barnes et al.

(10) Patent No.: US 10,455,019 B2
(45) Date of Patent: Oct. 22, 2019

(54) HIGHLY PERFORMANT RELIABLE MESSAGE STORAGE USING IN-MEMORY REPLICATION TECHNOLOGY

(71) Applicant: Oracle International Corporation, Redwood Shores, CA (US)

(72) Inventors: Thomas E. Barnes, Whitehouse Station, NJ (US); Richard L. Frank, Naples, FL (US); Arun Kaimalettu, Kerala (IN); Sal Gambino, Ringoes, NJ (US); Margaret M. Susairaj, Sugar Land, TX (US); Kathiravan Sengodan, Alpharetta, GA (US); Dongbo Xiao, Edison, NJ (US); Rajesh V. Patel, Burlington, MA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 14/849,262

(22) Filed: Sep. 9, 2015

(65) Prior Publication Data

US 2016/0070494 A1 Mar. 10, 2016

Related U.S. Application Data

(60) Provisional application No. 62/048,630, filed on Sep. 10, 2014.

(51) Int. Cl.
*H04L 29/08* (2006.01)
*G06F 3/06* (2006.01)

(52) U.S. Cl.
CPC .......... *H04L 67/1097* (2013.01); *G06F 3/065* (2013.01); *G06F 3/067* (2013.01); *G06F 3/0659* (2013.01)

(58) Field of Classification Search
CPC .............. G06F 3/067; G06F 17/30598; G06F 11/1464; G06F 3/065; G06F 11/1469;
(Continued)

(56) References Cited

U.S. PATENT DOCUMENTS 6,148,414 A * 11/2000 Brown ................. G06F 3/0607
714/11
7,320,088 B1 * 1/2008 Gawali ............... G06F 11/1662
709/219
(Continued)

OTHER PUBLICATIONS

United States Patent and Trademark Office, Office Action dated July 10, 2017 for U.S. Appl. No. 14/749,503, 11 Pages.
(Continued)

*Primary Examiner* — Yaima Rigol
(74) *Attorney, Agent, or Firm* — Tucker Ellis LLP

(57) ABSTRACT

A system and method can provide a scalable data storage in a middleware environment. The system can include a cluster of replicated store daemon processes in a plurality of processing nodes, wherein each machine node can host a replicated store daemon process of the cluster of replicated store daemon processes. Additionally, the system can include one or more replicated stores associated with an application server the processing node. The replicated store daemon cluster can persist data from a replicated store to another node, the other node also being associated with the replicated store daemon cluster. The system and method can additionally support a messaging service in a middleware environment. The messaging service can use the replicated store to store a copy of a message in the local processing node and on another processing node associated with the same replicated store daemon cluster.

20 Claims, 7 Drawing Sheets

(58) Field of Classification Search
CPC ........... G06F 11/2094; G06F 17/30233; G06F 9/45533; G06F 11/2007; G06F 2212/1032; G06F 17/30575; G06F 17/30584; G06F 3/0619; G06F 11/2056; G06F 17/30194; G06F 17/30212; G06F 17/30174; G06F 17/30578; H04L 67/1097; H04L 3/065; H04L 3/0659; H04L 3/067
See application file for complete search history.

(56) References Cited

U.S. PATENT DOCUMENTS

| | | | |
|---|---|---|---|
| 7,418,621 B2 | 8/2008 | Ashmore | |
| 7,643,468 B1 * | 1/2010 | Arregoces | H04L 12/462 370/351 |
| 9,003,144 B1 * | 4/2015 | Hayes | G06F 3/065 711/103 |
| 9,037,818 B1 * | 5/2015 | Natanzon | G06F 11/1456 711/162 |
| 9,053,167 B1 * | 6/2015 | Swift | G06F 17/30575 |
| 2002/0052914 A1 | 5/2002 | Zalewski et al. | |
| 2008/0028009 A1 * | 1/2008 | Ngo | G06F 11/2097 |
| 2009/0024817 A1 | 1/2009 | Oved | |
| 2009/0089313 A1 | 4/2009 | Cooper et al. | |
| 2010/0198985 A1 * | 8/2010 | Kanevsky | H04L 45/02 709/241 |
| 2010/0274762 A1 * | 10/2010 | Murphy | G06F 11/1446 707/636 |
| 2011/0302583 A1 * | 12/2011 | Abadi | G06F 17/30545 718/102 |
| 2012/0023209 A1 * | 1/2012 | Fletcher | H04L 12/40195 709/223 |
| 2013/0097615 A1 * | 4/2013 | Falco | G06F 9/546 719/313 |
| 2015/0269041 A1 * | 9/2015 | Long | G06F 11/2069 714/4.11 |
| 2015/0381725 A1 | 12/2015 | Haapaoja et al. | |

OTHER PUBLICATIONS

United States Patent and Trademark Office, Office Action dated Feb. 22, 2018 for U.S. Appl. No. 14/749,503, 15 Pages.
United States Patent and Trademark Office, Office Action dated Jul. 31, 2018 for U.S. Appl. No. 14/749,503, 16 Pages.

* cited by examiner

HIGHLY PERFORMANT RELIABLE MESSAGE STORAGE USING IN-MEMORY REPLICATION TECHNOLOGY

CLAIM OF PRIORITY

This application claims the benefit of priority to U.S. Provisional Application titled "HIGHLY PERFORMANT RELIABLE MESSAGE STORAGE USING IN-MEMORY REPLICATION TECHNOLOGY", Application No. 62/048,630, filed Sep. 10, 2014, which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to data processing, and are particularly related to systems and methods for enabling persistence of data, using replication technology.

BACKGROUND

Conventional disk based persistent storage requires expensive storage systems such as Storage Area Network/Network attached Storage (SAN/NAS) hardware to reliably store data without single point of failure. However, the SAN/NAS hardware cannot provide performance and throughput that can satisfactorily address the growing demands of the enterprise/cloud applications.

A typical enterprise application server environment supports the deployment of software applications to a cluster of processing nodes (variously referred to herein as machine nodes). To provide high-availability in the event of abnormal application or node behavior, a particular application may require its data to be persisted in some manner, which in turn typically requires the use of a backend filesystem or similar persistent storage medium that is accessible to all of the nodes.

However, the above approach generally does not scale well with increasing number of processing nodes. For example, a set of nodes may attempt to persist data to the backend filesystem at a rate that collectively exceeds the maximum rate at which the filesystem can actually write the data. In such situations, adding yet more nodes to the cluster provides little benefit, since the applications must wait for the backend filesystem to complete its write operations. These are the generally areas that embodiments of the invention are intended to address.

SUMMARY

Described herein are systems and methods that can provide a scalable data storage in a middleware environment. The system can include a cluster of daemon processes in a plurality of machine nodes, wherein each machine node can host a said daemon process and each daemon process provide access to a physical memory on a particular machine node. Additionally, the system can include one or more replicated stores associated with one or more application servers on a said machine node, wherein said one or more application servers can use the replicated store to store data in-memory across multiple machine nodes.

Also described herein are systems and methods that can support a messaging service in a middleware environment. The messaging service can use a replicated store to store a copy of a message in a local memory on a local machine node. Furthermore, the replicated store can create a replicated copy of the message on a remote machine node, based on the copy of the message stored in the local memory. Then, the system can recover the message from the remote machine node based on the replicated copy of the message if the local machine node fails.

DETAILED DESCRIPTION

Figure 1:
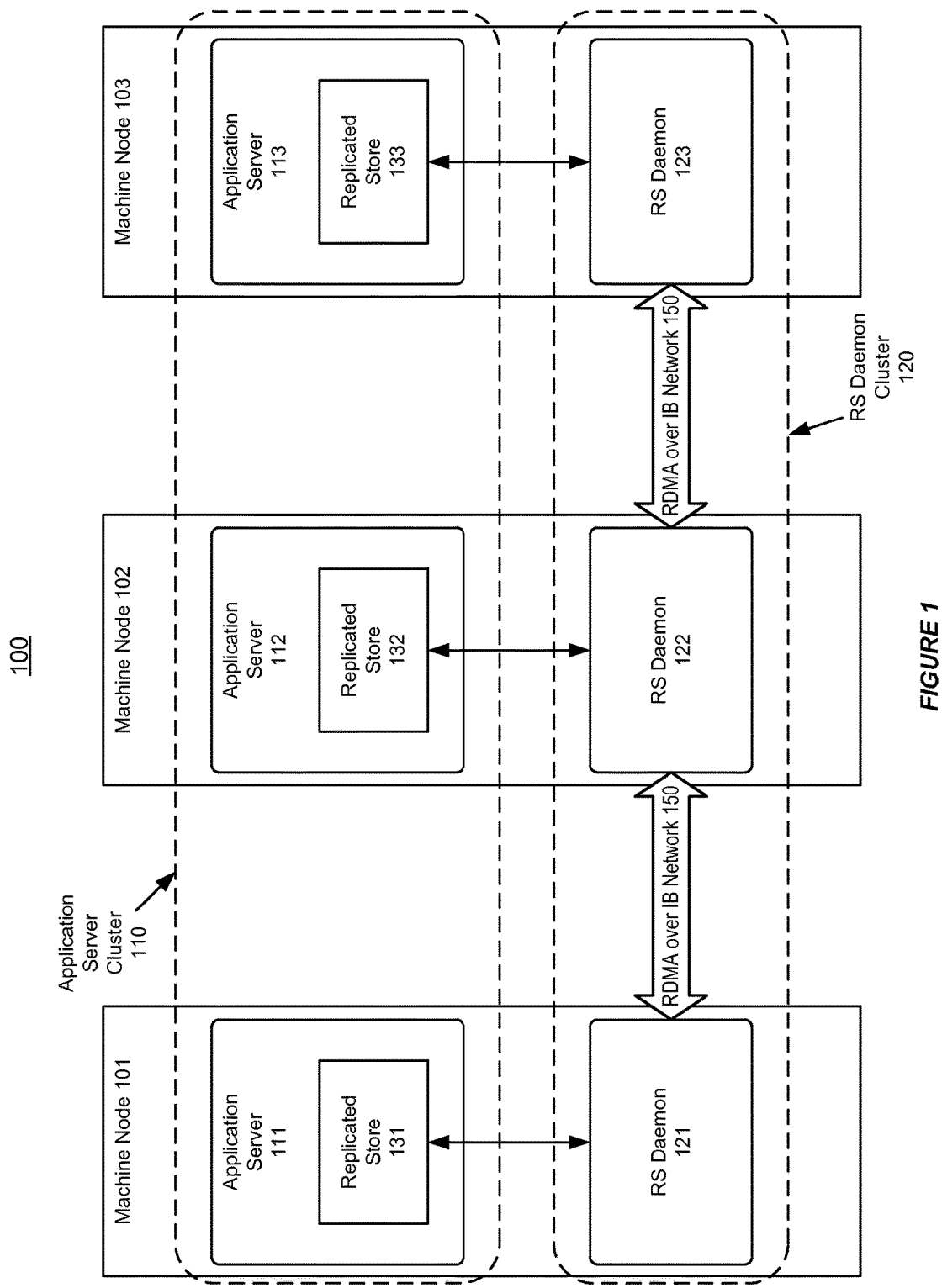
FIG. 1 shows an illustration of providing a scalable data storage in a middleware environment, in accordance with an embodiment of the invention.

The invention is illustrated, by way of example and not by way of limitation, in the figures of the accompanying drawings in which like references can indicate similar elements. It should be noted that references to "an" or "one" or "some" embodiment(s) in this disclosure are not necessarily to the same embodiment, and such references mean at least one.

The description of the invention as following uses the WebLogic application server environment as an example for a middleware environment. It will be apparent to those skilled in the art that other types of middleware environments can be used without limitation.

Described herein are systems and methods that can provide a scalable data storage and support a messaging service in a transactional middleware environment.

In accordance with an embodiment of the invention, the system comprises a combination of high performance hardware, e.g. 64-bit processor technology, high performance large memory, and redundant InfiniBand and Ethernet networking, together with an application server or middleware environment, such as WebLogic Suite, to provide a complete Java EE application server complex which includes a massively parallel in-memory grid, that can be provisioned quickly, and can scale on demand. In accordance with an embodiment, the system can be deployed as a full, half, or quarter rack, or other configuration, that provides an application server grid, storage area network, and InfiniBand (IB) network. The middleware machine software can provide application server, middleware and other functionality such as, for example, WebLogic Server, JRockit or Hotspot JVM, Oracle Linux or Solaris, and Oracle VM. In accordance with an embodiment, the system can include a plurality of compute nodes, IB switch gateway, and storage nodes or units, communicating with one another via an IB network. When implemented as a rack configuration, unused portions of the rack can be left empty or occupied by fillers.

In accordance with an embodiment of the invention, referred to herein as "Sun Oracle Exalogic" or "Exalogic", the system is an easy-to-deploy solution for hosting middleware or application server software, such as the Oracle Middleware SW suite, or Weblogic. As described herein, in accordance with an embodiment the system is a "grid in a box" that comprises one or more servers, storage units, an IB fabric for storage networking, and all the other components required to host a middleware application. Significant performance can be delivered for all types of middleware applications by leveraging a massively parallel grid architecture using, e.g. Real Application Clusters and Exalogic Open storage. The system delivers improved performance with linear I/O scalability, is simple to use and manage, and delivers mission-critical availability and reliability.

In accordance with an embodiment of the invention, a middleware system, such as a WebLogic application system, can take advantage of fast machines with multiple processors, such as an Exalogic middleware machine, and a high performance network connection, such as an InfiniBand (IB) network.

The present disclosure describes, in accordance with an embodiment, a replicated store persistence for WebLogic Messaging on Exalogic machines. WebLogic Messaging Services (JMS) can use replicated stores as a high performance alternative to existing File and JDBC (Java Database Connectivity) storage options. A replicated store stores data in local Exalogic node memory and also replicates it to memory on a second node. This can protect the data against failures and yields linearly scalable performance.

FIG. 1 shows an illustration of providing a scalable data storage in a middleware environment, in accordance with an embodiment of the invention. As shown in FIG. 1, a middleware environment 100 (also variously referred to herein as middleware system 100) can include an application server cluster 110 and a RS (replicated store) daemon cluster 120 (also referred to herein variously as daemon cluster), both of which can run on a plurality of machine nodes 101-103.

In accordance with an embodiment of the invention, each machine node 101-103 can host a RS (replicated store) daemon (also referred to herein variously as daemon and RS daemon process), which provides access to a physical memory on a particular machine node 101-103. For example, the machine node 101 can include a RS daemon 121, which is associated with an application server 111. Furthermore, the machine node 102 can include a RS daemon 122, which is associated with an application server 112, and the machine node 103 can include a RS daemon 123, which is associated with an application server 113.

As shown in FIG. 1, each of the application servers 111-113 can use a replicated store 131-133 to store data in-memory across multiple machine nodes 101-103. For example, each machine node in an Exalogic system can maintain a machine memory using a separate cluster of RS daemon cluster 120 (one RS daemon per Exalogic machine node). The replicated store 131-133 can maintain the data externally to a WebLogic application server cluster 110 in the machine memory (including a primary node and a secondary node).

In accordance with an embodiment of the invention, in order to support a messaging service, the replicated store 131-133 can store the message data in the physical memory on a (primary) node. The primary node can be replicated, including the message data, to a physical memory on another (secondary) node. These physical memories, which are managed by a set of RS daemons 121-123, can survive the crash as long as at least one daemon/node is up and running. The RS daemons 121-123 can communicate with each other via Remote Direct Memory Access (RDMA) over InfiniBand 150.

Additionally, when a node fails, the daemon cluster 120 can automatically copy the data from the surviving primary, or secondary, nodes to another functional/running node. As well, the middleware system 100 can prevent the creation of a single-point-of-failure. Also, the middleware system 100 can ensure high performance, and can scale linearly when an application server cluster is expanded across additional machine nodes.

Thus, the middleware system 100 can take advantage of the redundant hardware, the large physical memory, and the high bandwidth network (e.g. as provided by the Exalogic system), and can support significant speedup in comparison to the disk based file storage.

Figure 2:
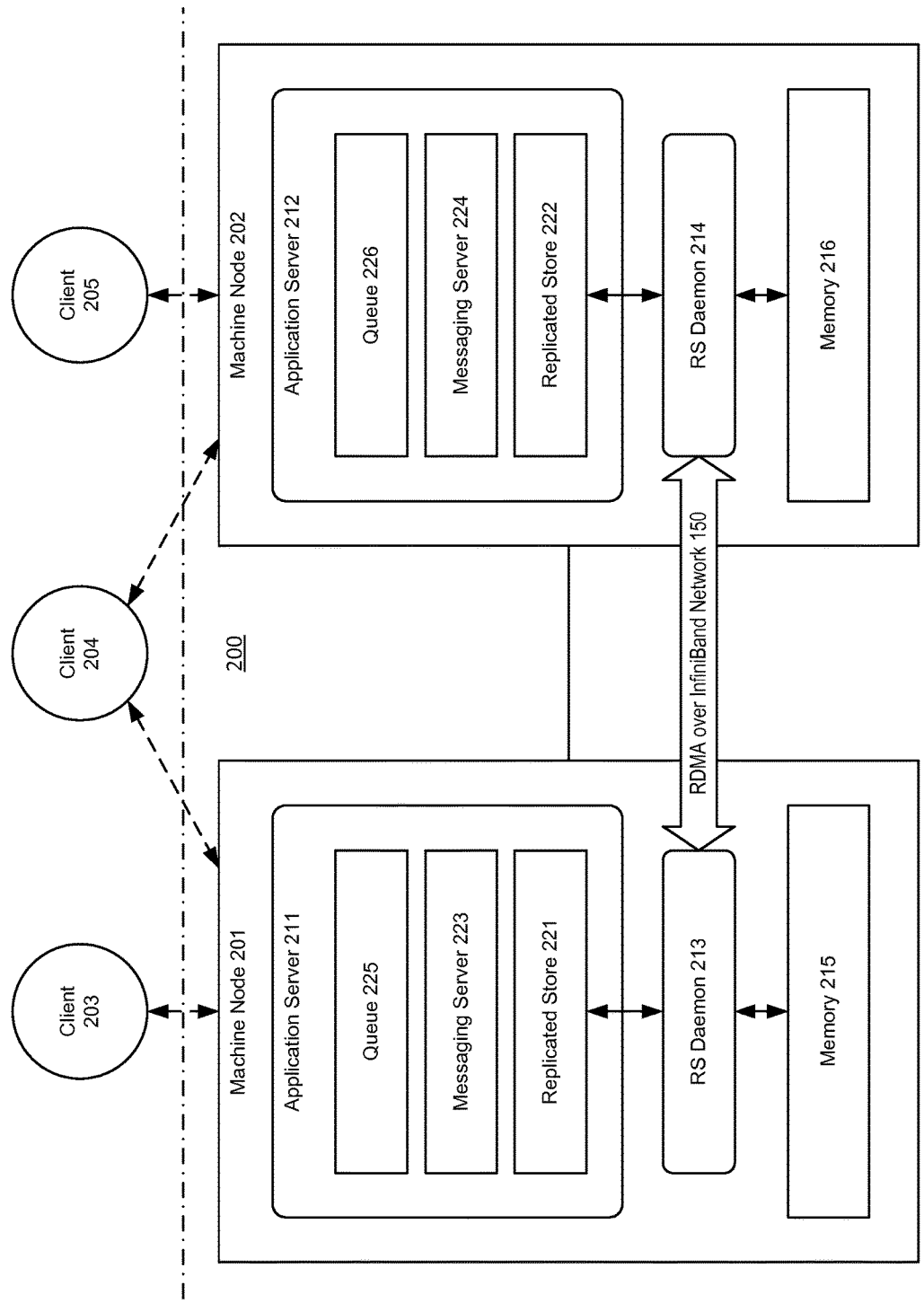
FIG. 2 shows an illustration of supporting message storage in a middleware environment, in accordance with an embodiment of the invention.

FIG. 2 shows an illustration of supporting message storage in a middleware environment, in accordance with an embodiment of the invention. As shown in FIG. 2, a plurality of clients 203-205 can access a plurality of machine nodes 201-202 that are interconnected in the middleware environment 200, e.g. via an InfiniBand (IB) network that is based on a Remote Direct Memory Access (RDMA) protocol 150.

For example, the machine node 201 can include an application server 211, which supports a queue 225, a messaging server 223, which can support a messaging service, and a replicated store 221. The machine node 202 can include an application server 212, which supports a queue 226, a messaging server 224, and a replicated store 222.

Additionally, the machine node 201 can include a RS daemon 213, which provides access to a memory 215. Also, the machine node 202 can include a RS daemon 214, which provides access to a memory 216.

In accordance with an embodiment of the invention, a plurality of clients 203-205 can access the messaging service, which is provided by the plurality of machine nodes 201-202 in the middleware environment 200.

For example, a messaging server 223 can use a replicated store 221 to store a copy of a message in a local memory 215, which is maintained by a local RS daemon 213. Immediately, the system can replicate the message to a memory 216 on a remote machine node 202.

When the machine node 201 fails, the messaging server 224 (or another messaging server on a different machine) can recover the message that was replicated in memory 216, using the replicated store 222.

Figure 3:
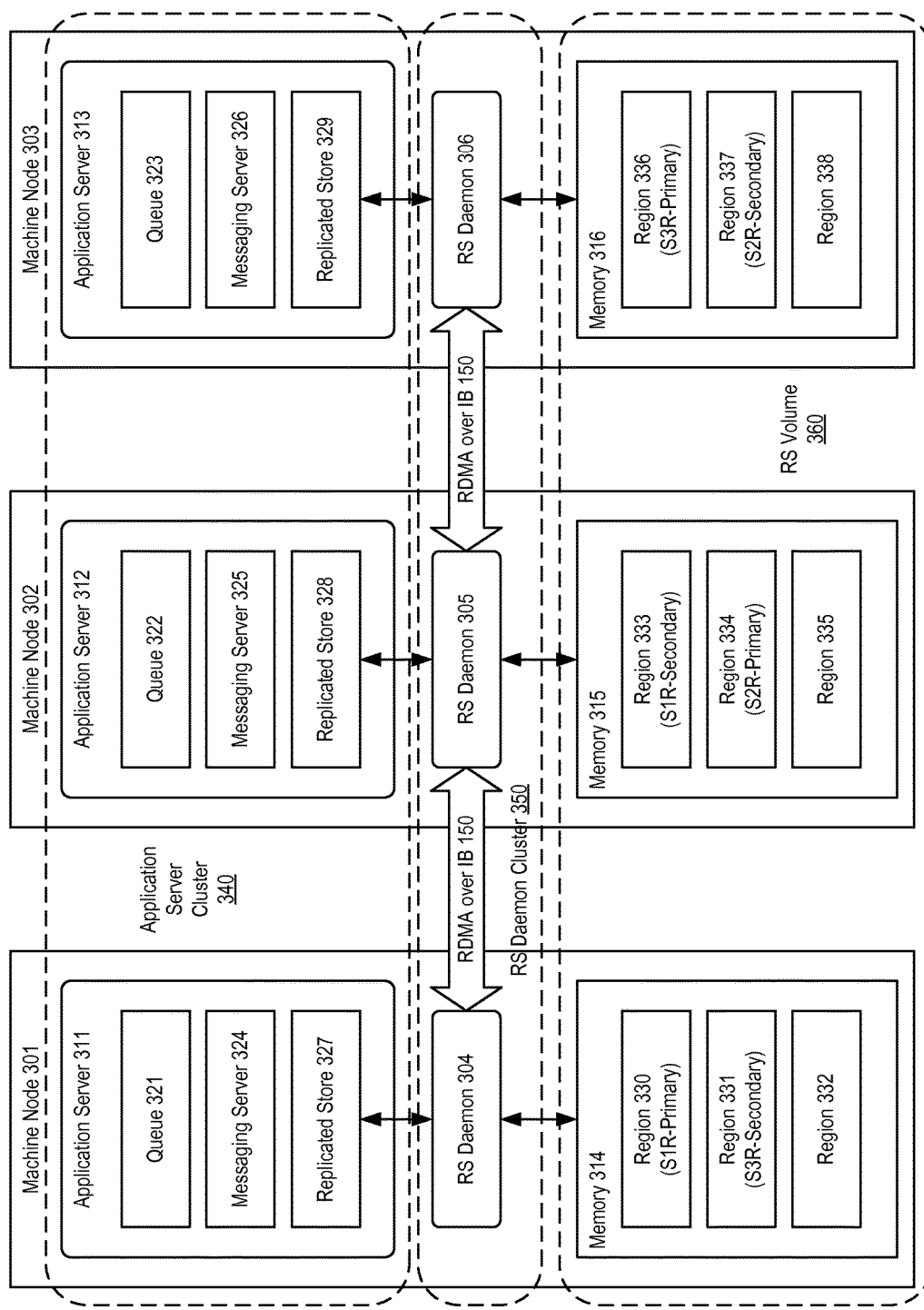
FIG. 3 shows an illustration of supporting message storage in a middleware environment, in accordance with an embodiment of the invention.

FIG. 3 shows an illustration of supporting message storage in a middleware environment, in accordance with an embodiment of the invention. As shown in FIG. 3, a middleware environment can include a plurality of machine nodes 301, 302, 303, such as an Exalogic nodes, where each machine node includes an application server such as, for example, 311, 312, and 313. Each machine node can additionally include an RS daemon, 304, 305, 306, which RS daemons 304, 305 and 306 can communicate with each other via Remote Direct Memory Access (RDMA) over Infini-Band 150. Additionally, each RS daemon can be associated with a memory (e.g., shared memory) 314, 315, 316.

As shown in FIG. 3, each application server can include a queue 321, 322, 323, a messaging server 324, 325, 326, and a replicated store 327, 328, and 329. Each memory 314, 315, 316 can be comprised of a plurality of fixed sized regions 330-338. The application servers 311, 312, 313 can be organized in an application server cluster 340, such as a dynamic application server cluster, and the RS daemons can be organized in an RS daemon cluster 350. Each memory (e.g., physical memory, RAM) 314, 315, 316, can be organized into a replicated store (RS) volume.

In accordance with an embodiment, each replicated store instance can act as a client that opens one or more fixed size regions within the memory, the memory being accessed and maintained by the RS daemons. The replicated store can then subsequently write data to or read data from these regions. Regions are not shared between replicated store instances—each replicated store instance maintains its own unique set of regions.

Once a replicated store opens/writes to a region in the memory, the replicated store's local RS daemon, that is the RS daemon in the same node as the replicated store (i.e., primary RS daemon), is responsible for maintaining the region's primary copy, and the next available RS daemon (e.g., neighboring RS daemon, secondary RS daemon) can maintain a secondary copy of the region. The next available RS daemon can be determined by finding the nearest subsequently defined RS daemon in a configuration file stored at a global directory (see FIG. 5), or, if the primary RS daemon happens to be the last RS daemon in the configuration file, then the next available RS daemon can be the first-most up-and-running RS daemon in the configuration file. For example, in looking at FIG. 3, replicated store 327 can open/write data to region 330, which is maintained by local RS daemon 304. This is shown in the Figure by labeling region 330 as S1R-Primary. The neighboring RS daemon 305 is then responsible for maintaining the secondary copy of the data in a region within its associated memory 315. This is shown in FIG. 3 in region 333, labeled as S1R-Secondary, indicating the secondary copy of the data. The writing of data in the primary region and the secondary region can, in certain embodiments, happen automatically and simultaneously.

In accordance with an embodiment, a RS daemon cluster can be managed separately from a WebLogic Cluster and can be formed from a set of native RS daemon processes, typically one per Exalogic node, that all share a same global directory (discussed later with respect to FIG. 5). An RS daemon cluster persists data on behalf of the replicated store clients to which the RS daemon is associated to a single logical shared in-memory-replicated storage area (e.g., shared memory, RAM). Each RS daemon process can have a unique IP address and port that replicated stores can use to first initiate contact with the RS daemon. Once attached to a RS daemon, subsequent communication between replicated stores and RS daemons can use shared memory and InfiniBand RDMA.

An RS daemon cluster can support high availability in two ways. First, data that's stored in a region within the memory, such as memory 314, 315, or 316, is preserved and replicated for later recovery even after clients have detached. This means that a write request will not normally succeed until it has been copied to two separate regions within different nodes. Second, any region in a volume can be accessed from any node in the volume that hosts a running RS daemon. This allows regions to be recoverable from any server in a RS daemon cluster, even after a WebLogic Server, RS daemon, or node failure.

In accordance with an embodiment, replicated stores, such as WebLogic replicated stores, can be configured as an alternative to the existing File and JDBC custom store types. WebLogic's Messaging Services (JMS Servers, SAF Agents, and Path Services) can be configured to use a JDBC Store, a File Store, or a Replicated Store in order to persist their data. A WebLogic Server Replicated Store that's targeted to a WebLogic Cluster generates an instance per WebLogic Server, whereas a replicated store that's targeted directly to a WebLogic Server or migratable target can generate a single instance.

In accordance with an embodiment, replicated stores, which can run in application servers such as WebLogic Servers, can act as clients of a RS daemon cluster. A particular replicated store instance can attach to a RS daemon that's running on the same node (e.g., associated with) as the replicated store instance and that also has a same global directory (see FIG. 5). Once attached, a replicated store instance can create and/or open one or more fixed size regions in the RS daemon cluster that are uniquely named for that instance—e.g. different replicated store instances do not share the same regions.

Figure 4:
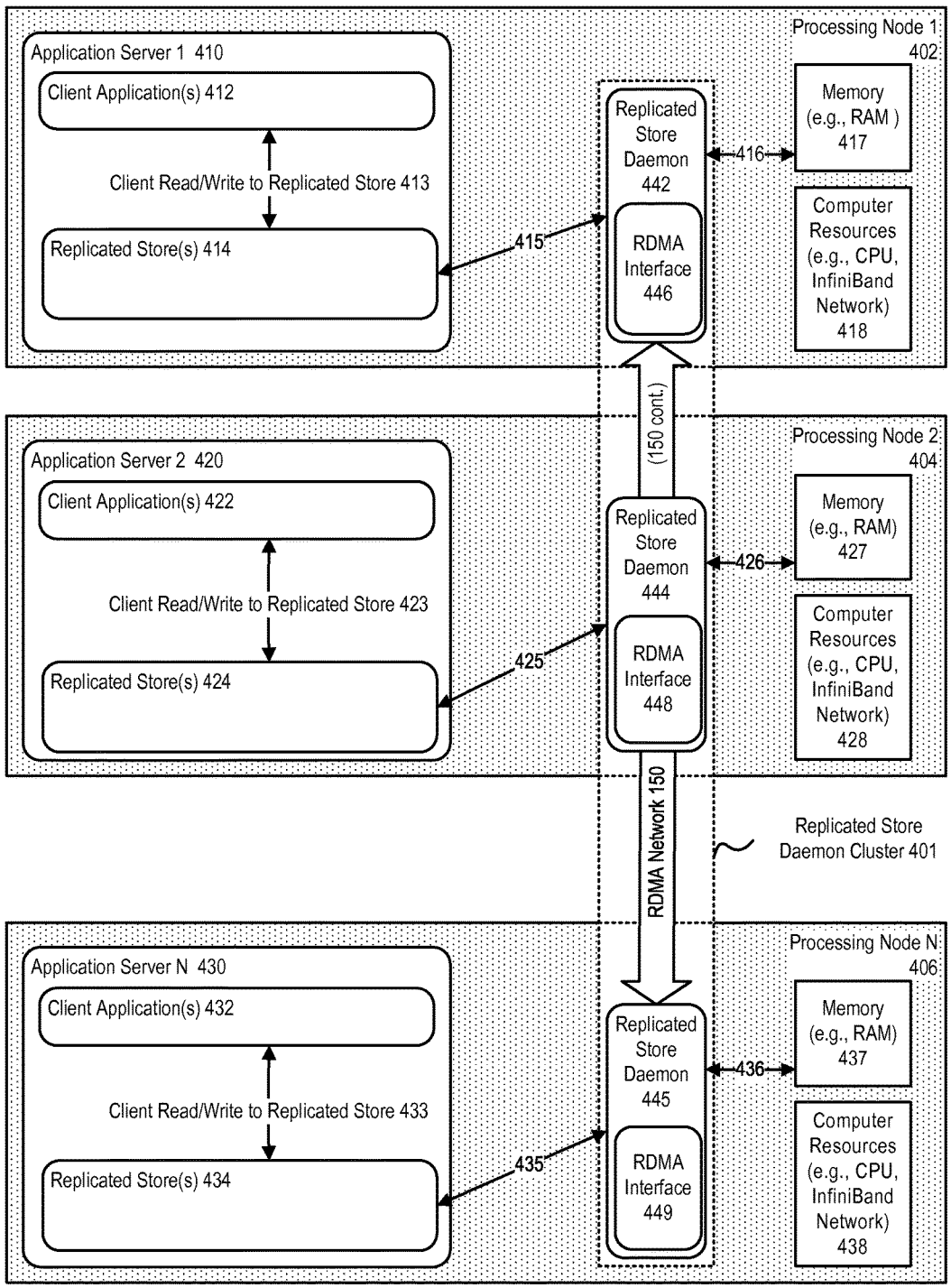
FIG. 4 is an illustration of providing a scalable data storage in a middleware environment, in accordance with an embodiment of the invention.

FIG. 4 is an illustration of providing a scalable data storage in a middleware environment, in accordance with an embodiment of the invention. As shown in FIG. 4, in accordance with an embodiment, a computer system (e.g., an Oracle Exalogic system) can include a plurality of processing nodes (e.g., a plurality of Oracle Exalogic nodes) such as, for example, processing node 1 (402), processing node 2 (404), and processing node N (406), each of which includes one or more physical or hardware computer components or resources 418, 428, and 438, for example, one or more processor/CPU, or InfiniBand network components, and physical or hardware volatile memory (e.g., RAM) 417, 427, and 437.

In accordance with an embodiment, each processing node supports the execution of one or more application server instances 410, 420, 430 (e.g., Oracle WebLogic server instances), wherein each application server instance supports the execution of one or more client software applications (client applications, clients) 412, 422, 432.

In accordance with an embodiment, a replicated store daemon cluster (daemon cluster) 401, comprises a plurality of replicated store daemons (RS daemons, daemons), including RS daemons 442, 444, 445 operating at and associated with each processing node. Each RS daemon includes an RDMA interface 446, 448, 449, which provides access to an RDMA over InfiniBand network (RDMA network) 150, and enables read/write access 416, 426, 436, to that associated node's physical memory. The daemons can allocate and expose node memory to clients (e.g., replicated stores) via network endpoints, at which data operations such as reads and writes can be performed by client applications, in a manner similar to the use of a block storage device.

In accordance with an embodiment, each application server can include a replicated store 415, 425, 434, to which the client/client application can read/write 413, 423, 433. Each of the replicated stores can also be accessed 415, 425, 435, by an associated RS daemon using RDMA reads and writes to transfer replicated store data between local and remote nodes, and to persist the data to a node's physical memory.

Figure 5:
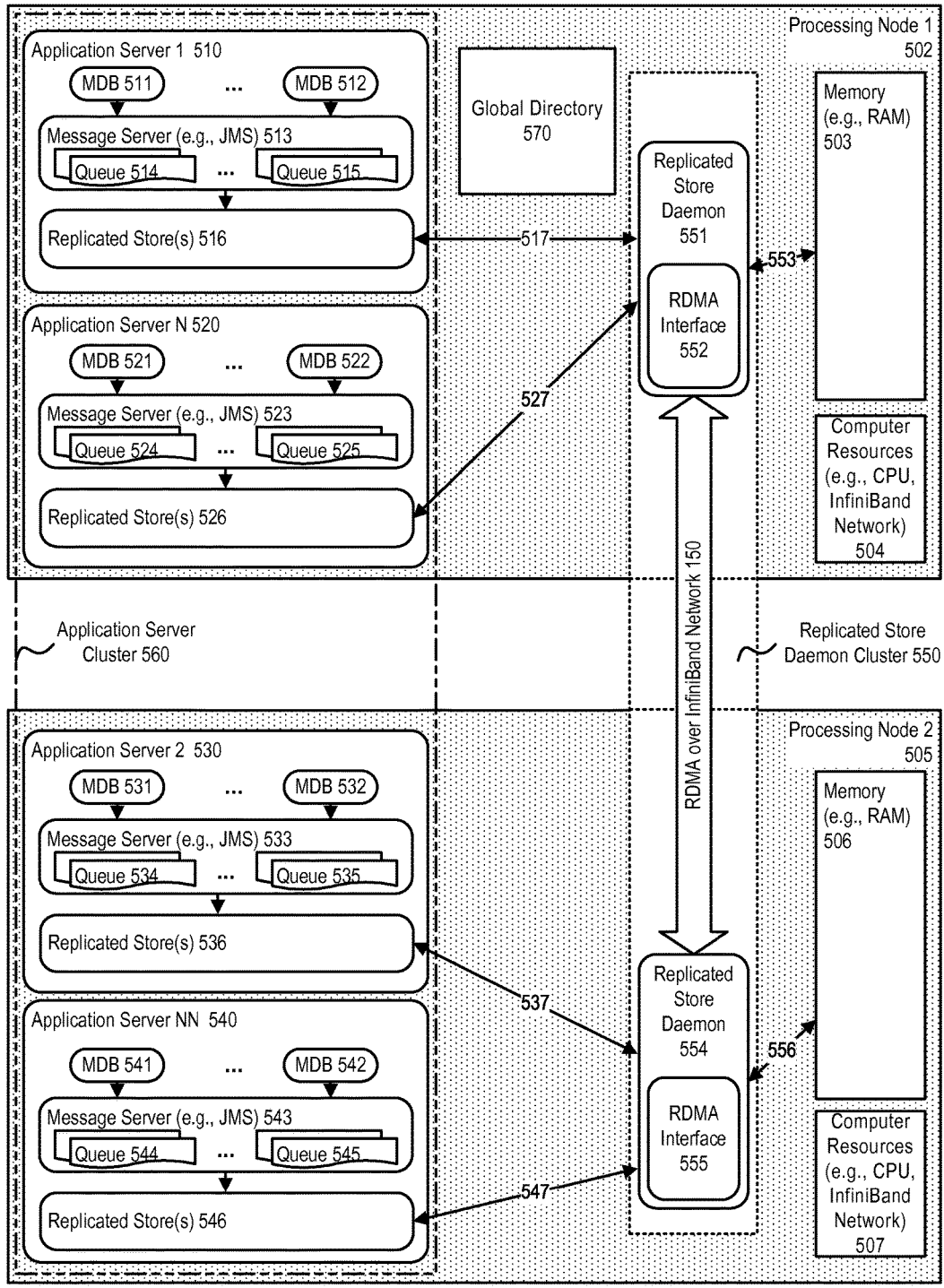
FIG. 5 shows an illustration of supporting message storage in a middleware environment, in accordance with an embodiment of the invention.

FIG. 5 shows an illustration of supporting messaging storage in a middleware environment, in accordance with an embodiment of the invention. As shown in FIG. 5, in accordance with an embodiment, a system can include a plurality of processing nodes (e.g., a plurality of Oracle Exalogic nodes) such as, for example, processing node 1 502, and processing node 2 505, each of which includes one or more physical or hardware computer components or resources 504, 507, for example, one or more processor/CPU, or InfiniBand network components, and physical or hardware volatile memory (e.g., RAM) 503, 506.

As shown in FIG. 5, in accordance with an embodiment, in a WebLogic environment, each processing node can contain a plurality of application servers, for example 510, 520, 530, 540, that are grouped in application sever cluster 560. Each application server can include a messaging server (e.g., JMS, Java Message Services) 513, 523, 533, 543, having queues 514, 515, 524, 525, 534, 535, 544, 545, and associated with message driven beans (MDB) 511, 512, 521, 522, 531, 532, 541, 542, and can use replicated stores 516, 526, 536, 546, and the associated replicated store daemon cluster 550 as a high performance alternative to file-based or JDBC storage options. A replicated store can store client JMS data (such as messages) in local node memory, and replicate that data to memory on a second node, with support for high-availability, and yielding linearly-scalable performance. Each of the replicated stores 516, 526, 536, and 546 can also be accessed 517, 527, 537, and 547, by an associated RS daemon using RDMA reads and writes to transfer replicated store data between local and remote nodes, and to persist the data to a node's physical memory.

In accordance with an embodiment, a replicated store daemon cluster (daemon cluster) 550 comprises a plurality of replicated store daemons (RS daemons, daemons), including an RS daemon 551 and 554 operating at and associated with each processing node (e.g., one RS daemon per processing node). Each RS daemon includes an RDMA interface 552, 555, which provides access to an RDMA over InfiniBand network (RDMA network) 150, and enables read/write access 553, 556, to that associated node's physical memory. The RS daemons can allocate and expose node memory to clients via network endpoints, at which data operations such as reads and writes can be performed by client applications, in a manner similar to the use of a block storage device. For even higher availability, in a WebLogic environment, a WebLogic replicated store can be migrated along with its parent application server instance as part of a WebLogic Whole Server Migration (WSM), which provides automatic and manual migration at the server level, rather than on the service level, and automatically restarts or migrates failed WebLogic replicated stores. When a JMS server instance fails, its replicated store can be recovered by restarting on any machine that hosts a running RS daemon in its daemon cluster.

In accordance with an embodiment, a global directory 570 can also be provided. The global directory can contain shared RS daemon cluster configuration, RS daemon log files, and internal runtime files such as lock files. There can exist a one-to-one correspondence between RS daemon clusters and global directories (different RS daemon clusters cannot share the same RS global directory). Replicated stores can also reference the global directory used by an RS daemon cluster in order to attach to that RS daemon cluster. A global directory can be an NFS (network file system) mount that can be located on an Exalogic machine's ZFS (zettabyte file system) Storage Appliance (the ZFSSA) and can be centrally accessible by all Exalogic nodes that host components which work with the same RS volume.

In accordance with an embodiment, the global directory 570 can be an administrator defined shared directory in a custom tuned NFS mount on an Exalogic machine's ZFS Storage Appliance. The global directory can contain the RS daemon cluster configuration file (e.g., rs_daemons.cfg) plus various runtime generated files. Additionally, RS components—such as Daemons, WebLogic Replicated Stores, and the Store Admin Utility—can specify the same global directory in order to communicate. Different RS daemon clusters cannot share the same RS global directory.

Figure 6:
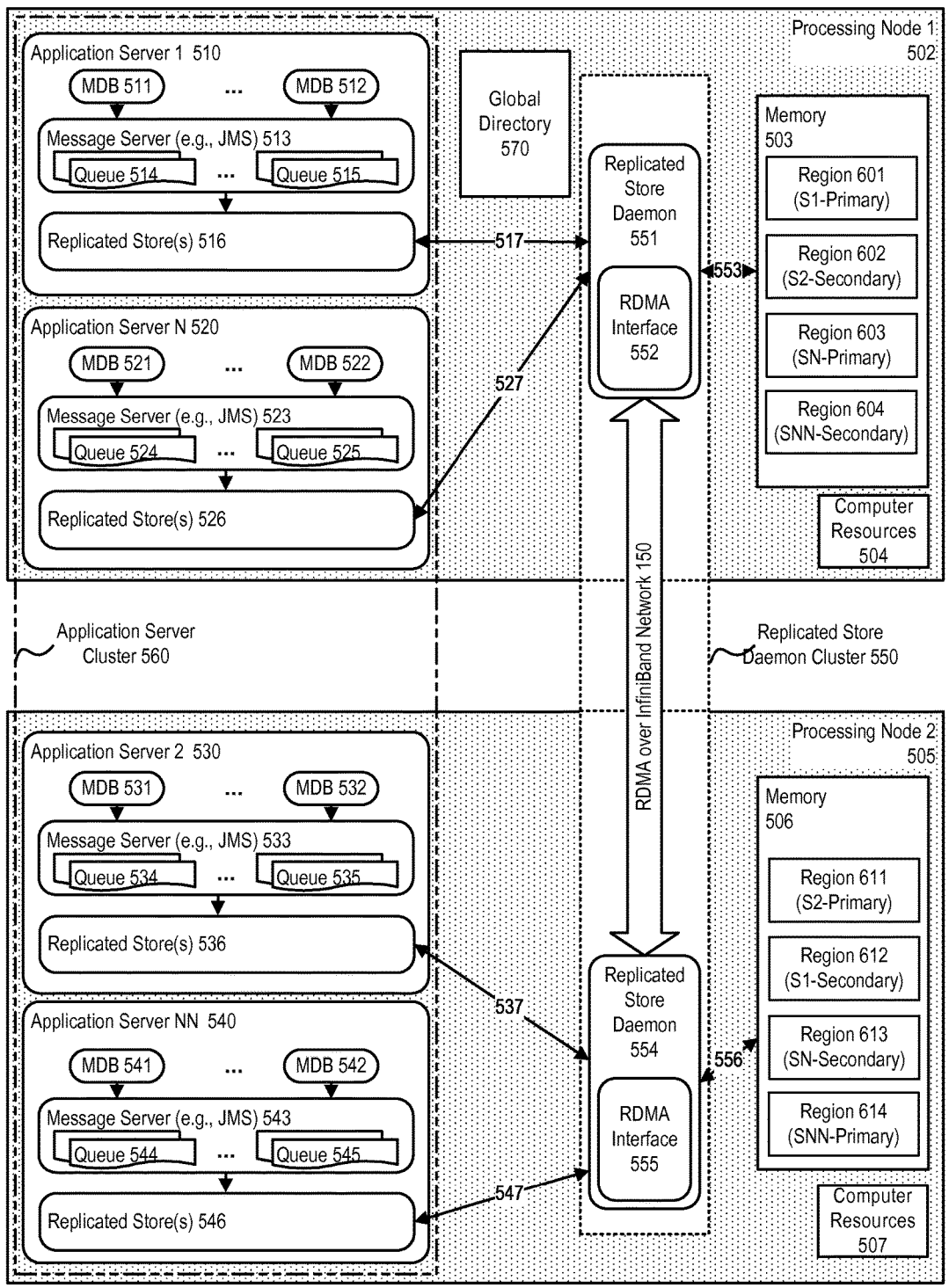
FIG. 6 shows an illustration of supporting message storage in a middleware environment, in accordance with an embodiment of the invention.

FIG. 6 shows an illustration of supporting messaging storage in a middleware environment, in accordance with an embodiment of the invention. As shown in FIG. 6, in accordance with an embodiment, a system can include a plurality of processing nodes (e.g., a plurality of Oracle Exalogic nodes) such as, for example, processing node 1 502, and processing node 2 505, each of which includes one or more physical or hardware computer components or resources 504, 507, for example, one or more processor/CPU, or InfiniBand network components, and physical or hardware volatile memory (e.g., RAM) 503, 506.

As shown in FIG. 6, in accordance with an embodiment, in a WebLogic environment, each processing node can contain a plurality of application servers, for example 510, 520, 530, 540, that are grouped in application sever cluster 560. Each application server can include a messaging server (e.g., JMS) 513, 523, 533, 543, having queues 514, 515, 524, 525, 534, 535, 544, 545, and associated with message driven beans (MDB) 511, 512, 521, 522, 531, 532, 541, 542, and can use replicated stores 516, 526, 536, 546, and the associated replicated store daemon cluster 550 as a high performance alternative to file-based or JDBC storage options. A replicated store can store client JMS data in local node memory, and replicate that data to memory on a second node, with support for high-availability, and yielding linearly-scalable performance. Each memory 503, 506 can be comprised of a plurality of fixed sized regions 601-604, 611-614, with the size of the regions being defined in the global directory.

In accordance with an embodiment, a replicated store daemon cluster (daemon cluster) 550 comprises a plurality of replicated store daemons (RS daemons, daemons), including an RS daemon 551 and 554 operating at and associated with each processing node (e.g., one RS daemon per processing node). Each RS daemon includes an RDMA interface 552, 555, which provides access to an RDMA over InfiniBand network (RDMA network) 150, and enables read/write access 553, 556, to that associated node's physical memory. The RS daemons can allocate and expose node memory to clients, such as replicated stores 516, 526, 536, 546, via network endpoints, at which data operations such as reads and writes can be performed by client applications, in a manner similar to the use of a block storage device. For even higher availability, in a WebLogic environment, a WebLogic replicated store can be migrated along with its parent application server instance as part of a WebLogic Whole Server Migration (WSM), which provides automatic and manual migration at the server level, rather than on the service level, and automatically restarts or migrates failed WebLogic replicated stores. When a JMS server instance fails, its replicated store can be recovered by restarting on any machine that hosts a running RS daemon in its daemon cluster.

In accordance with an embodiment, information placed in to a replicated store within a particular machine, the replicated store, acting as a client of its local RS daemon, can open/write to a region in the node's memory via the replicated store's local RS daemon, that is the RS daemon in the same node as the replicated store (i.e., primary RS daemon). Then, the local (primary) RS daemon is responsible for maintaining the region's primary copy, and the next available RS daemon (e.g., neighboring RS daemon, secondary RS daemon) can maintain a secondary copy of the region. The next available RS daemon can be determined by finding the nearest subsequently defined RS daemon in a configuration file stored at a global directory 570, or, if the primary RS daemon happens to be the last RS daemon in the configuration file, then the next available RS daemon can be the first-most up-and-running RS daemon in the configuration file. For example, in looking at FIG. 6, replicated store 516, which is associated with application server 1, can open/write data to region 601, which is maintained by local RS daemon 551. This is shown in the Figure by labeling region 601 as S1-Primary. The neighboring RS daemon (RS daemon 554) is then responsible for maintaining the secondary copy of the data in a region within its associated memory 506. This is shown in FIG. 6 in region 612, labeled as S1-Secondary, indicating the secondary copy of the data. The writing of data in the primary region and the secondary region can, in certain embodiments, happen automatically and simultaneously.

Figure 7:
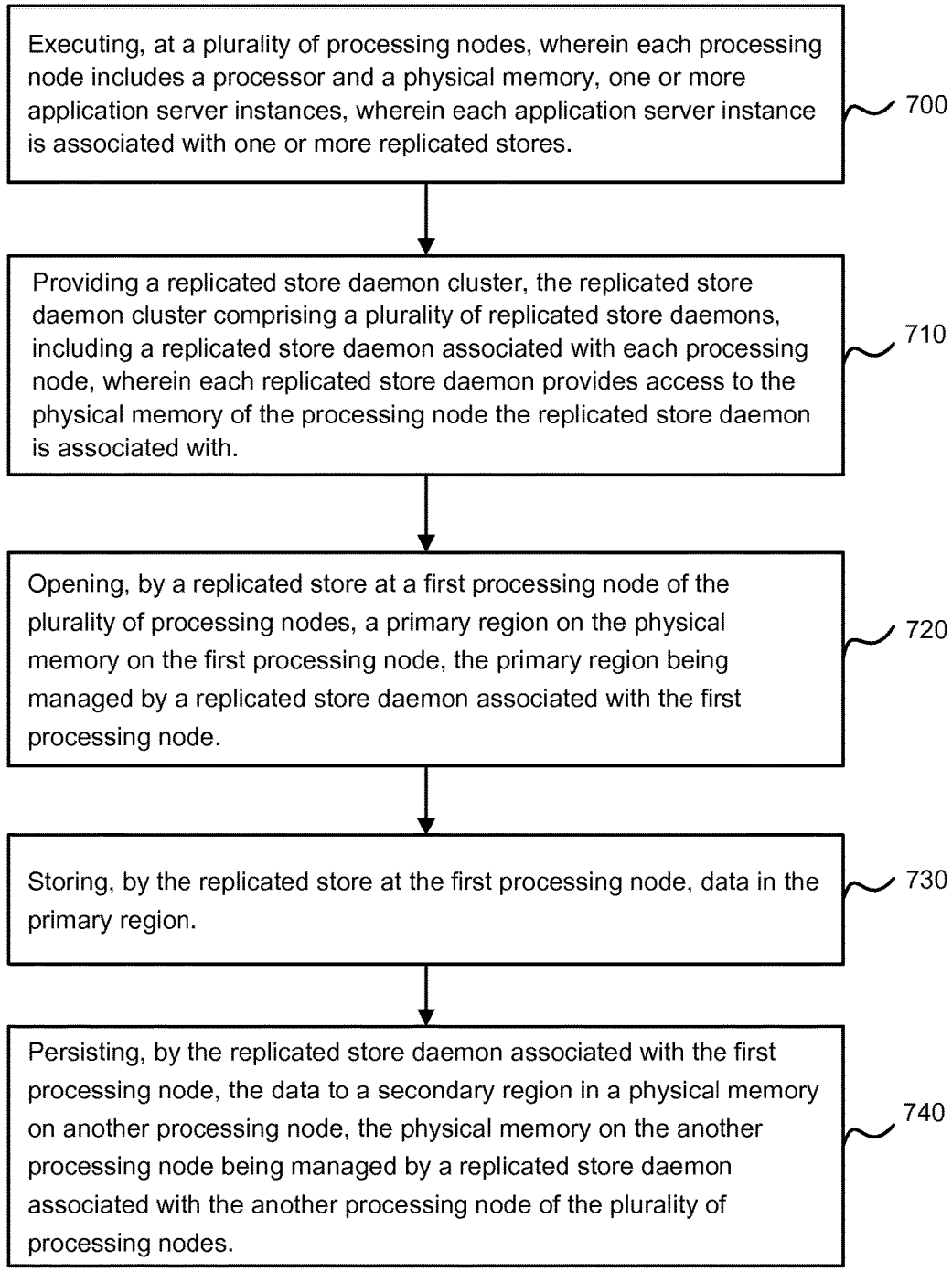
FIG. 7 shows a flowchart for a method for persistence of data, in accordance with an embodiment.

FIG. 7 shows a flowchart for a method for persistence of data, in accordance with an embodiment.

As shown in FIG. 7, at step 700, a plurality of processing nodes, each processing node comprising a processor and a physical memory, can execute one or more application server instances, wherein each application server instance is associated with one or more replicated stores.

At step 710, the method can provide a replicated store daemon cluster, the replicated store daemon cluster comprising a plurality of replicated store daemons, including a replicated store daemon associated with each processing node, wherein each replicated store daemon provides access to the physical memory of the processing node the replicated store daemon is associated with.

At step 720, the replicated store at a first processing node of the plurality of processing nodes can open a primary region on the physical memory of the first processing node, the primary region being managed by a replicated store daemon associated with the first processing node.

At step 730, the method can continue with storing, by the replicated store at the first processing node, data in the primary region.

At step 740, the replicated store daemon associated with the first processing node can persist the data to a secondary region in a physical memory on another processing node, the physical memory on the another processing node being managed by a replicated store daemon associated with the another processing node of the plurality of processing nodes.

Replicated Store Daemon Cluster

In accordance with an embodiment, a RS daemon cluster forms a single logical in-memory storage area called an RS volume which spans across the cluster's nodes. An RS volume can contain uniquely named fixed sized RS regions that are dynamically created, read, and written by WebLogic replicated store instances. These regions can be automatically and transparently replicated across RS daemons to provide high availability. All RS daemons in the same RS daemon cluster can share a single common NFS directory called a global directory that is used for the RS daemon cluster configuration and runtime information.

Daemon clusters, in accordance with an embodiment, can be managed separately from WebLogic servers. The RS daemon clusters can have a supplied daemon start script and configuration file. The RS daemon clusters can additionally generate their own file logs, and can be administered during runtime by dedicated store admin utility commands. Each RS daemon from the same RS daemon cluster can share a same central global directory, at which is stored each a configuration file for each RS daemon, for example in the form of a common "rs_daemons.cfg" text file that can be located at the root of this global directory.

An RS daemon cluster can be, in accordance with an embodiment, physically comprised of a set of native RS daemon driver processes (RS daemons) that are hosted on one or more nodes of an Exalogic machine. Each RS daemon process can have a unique shared memory with a location defined by a numeric Shared Memory Key, plus also has its own TCP/IP listen Address and listen Port.

In accordance with an embodiment, an RS daemon process services requests from clients that run on the same node as the RS daemon process. The clients can be, for example, replicated store instances running inside WebLogic Server JVMs, or admin tooling command line instances. Clients initiate contact with a local RS daemon by specifying the same global directory as the RS daemon cluster, which can contain configuration file, such as rs_daemons.cfg, that includes, for example, the TCP/IP address and port of the client's local RS daemon. Once contact has been established over TCP/IP, clients can subsequently communicate with the RS daemon cluster by a combination of direct access to local shared memory and access to remote memory using InfiniBand and RDMA.

In situations where a particular RS daemon runs low on shared memory, the RS daemon can communicate the situation to potentially affected clients so that the clients can flow control their memory usage. This information can also be passed to an administrator, such as a system administrator, via log messages in, for example, server admin logs. As well, and in particular, Messaging Servers can start rejecting new messages until enough old messages are consumed. The messaging engine can use the information regarding low memory to automatically prevent additional messages from entering the system. This can be accomplished by optionally blocking sender clients a short while until the condition is cleared (i.e., enough memory is available), or by throwing an exception, such as a standard JMS ResourceAllocationException, to clients.

In accordance with an embodiment, a configuration filed stored at the global directory, such as rs_daemons.cfg, can be an administrator created and contain an entry for each RS daemon in an RS daemon cluster, optional blank lines, and optional comments that are prefixed with a #. Each entry can specify an address, port, shared memory key, and optional memory limit, for example, in the format:

address   port   starting-shared-memory-key   shared-memory-limit

Each entry, in accordance with an embodiment, can specify a unique combination of address and port—no two entries should have both the same address and the same port. The address can be a name or a numeric IP, and can correspond to an InfiniBand address on the node of the RS daemon.

A starting shared memory key for each RS daemon can be a suggested location for the RS daemon to start looking for available shared memory keys. RS daemons that run on the same node can have different shared-memory-keys.

In accordance with an embodiment, a RS daemon can use shared memory to store region data. A RS daemon shared-memory-limit can be specified as an integer followed by "M", "MB", "G", or "GB" to indicate megabytes or gigabytes. It can be set to be a multiple of the region size so that the RS daemon has sufficient memory to host multiple region both primary regions and secondary regions.

Replicated Store Daemon Cluster Region Uniqueness and Locking

In accordance with an embodiment, a replicated store instance can open one or more regions in a daemon cluster, and a particular named RS region can only be safely accessed by a single instance at a time. This requirement can be enforced in the following ways. First, configuration files can ensure that all replicated stores within a domain are uniquely named (e.g., an attempt to configure a same named store will fail). Next, WebLogic's "exactly once" fail-over features can automatically ensure that no two same-named replicated store instances within a domain are booted and running at the same time. These features can migrate a WebLogic Server between nodes (termed whole server migration), or can migrate a Replicated Store instance between WebLogic Servers in the same cluster (termed service migration). Additionally, RS daemons can protect each open region within an RS volume with a lock file that can be located in the global directory. An attempt by more than one client (e.g., replicated store) to open the same region can fail with a lock error in RS daemon logging. Finally, each WebLogic replicated store instance can maintain a lock file in its RS volume's global directory for each of its regions. This file remains even after the replicated store instance shuts down. An attempt to open a replicated store instance when another replicated store instance is already running can fail with a lock exception.

In accordance with an embodiment, if more than one WebLogic domain is configured to access the same RS volume, then administrators can be responsible for ensuring that the domains have different names; otherwise, same-named replicated stores between the different domains will result in conflicting attempts to open a same-named region and result in locking ERRORs in both WebLogic Server and in Daemon logs.

RS Daemon High Availability (Resilvering)

In accordance with an embodiment, resilvering is the process of generating a new copy of a region from an existing copy.

As described above, in accordance with an embodiment, a replicated store instance can maintain its data in one or more uniquely named RS regions within a RS daemon cluster, and a RS daemon cluster in turn, can maintain at least two copies of each region on separate RS daemons (primary and secondary).

When a replicated store opens a new region, the local RS daemon can responsible for maintaining the primary copy of the region, and the next available RS daemon can maintain the secondary copy of the region. The next available RS daemon is determined by finding the nearest (closest to the primary RS daemon) subsequently defined RS daemon in the rs_daemons.cfg file that is up and running, or, if the primary RS daemon happens to be the last RS daemon in the file, then the next available RS daemon can be the first-most up-and-running RS daemon in the file.

In accordance with an embodiment, when a replicated store opens an existing region that has no pre-existing copy on the store's local RS daemon, but already has copies elsewhere in the cluster, then the open can still succeed, and one of the existing copies can be transparently resilvered to the local RS daemon as part of the region open. In addition, the region's secondary can be resilvered to the next available RS daemon. The resilvering of the secondary can help ensure that regions stay evenly distributed throughout a daemon cluster.

In accordance with an embodiment, when a RS daemon fails, any locally attached clients (replicated store instances) can also fail. Clients can recover particular region data by periodically retrying attaches to the failed RS daemon or by migrating and trying to attach to a different RS daemon in the same daemon cluster. The other RS daemons in the cluster can detect the failure, and each of the failed RS daemon's primary and secondary region copies can be automatically resilvered to another RS daemon. This resilvering can occurs even if the replicated store client does not itself restart and reattach somewhere else in the cluster.

In accordance with an embodiment, in the event when a region resilver from a primary to a new secondary is in progress, and the secondary's host RS daemon fails, then resilvering transparently and asynchronously can start over with a new secondary on another RS daemon provided there are at least two Daemons still running in the cluster.

Replicated Stores

As described above, in accordance with an embodiment, a replicated store is an alternative to the existing File and JDBC custom store types and can be used by WebLogic Messaging JMS Servers, SAF Agents, and Path Services. Replicated stores persist their data into a RS daemon cluster volume (RS volume).

In accordance with an embodiment, replicated store instances can managed via a WebLogic Server custom store type. This custom store type can be exposed as a parallel alternative to the existing File and JDBC store options. WebLogic JMS Servers, SAF Agents, and Path Services can all use replicated stores.

There are, in accordance with an embodiment, three main configuration fields for a replicated store. These include name, targets, and directory. The directory field can refer to the common global directory (the global directory common to the replicated store and the RS daemon cluster), and can contain a configuration file, such as rs_daemons.cfg, at its root. Additional fields can be provided to disambiguate which local RS daemon to attach to (LocalIndex), and to fine tune behavior (RegionSize, etc.).

Administrators can configure the name of each replicated store, and WebLogic configuration can ensure that all replicated stores within a WebLogic domain are uniquely named (an attempt to configure two same named replicated stores can fail).

Replicated store runtime instances within a domain can also be uniquely named, following the same pattern as File Stores. For a Replicated Store targeted at a WebLogic server or Migratable Target, the runtime instance name corresponds with the Replicated Store name. For example, a Replicated Store targeted at a cluster, the runtime instance name can be "<ConfiguredRStoreName>@<WLServerName>".

In accordance with an embodiment, similar to File and JDBC Stores, a replicated store can be targeted to a WebLogic Server, a WebLogic Cluster, or a WebLogic Migratable Target. When an Agent or JMS Server uses an RS store, then their targets can match. For example, if an agent uses RS Store A and has a target of Cluster1, then the target of RS StoreA can also be set to Cluster1.

According to an embodiment, a replicated store instance can automatically attach to an RS daemon that is hosted on the same Exalogic node as the replicated store instance. The replicated store instance can accomplish this by consulting the configuration file\found in the root of the common configured global directory and applying the following method. If no RS daemon is configured to run on the current node, then the replicated store instance will fail to start and log an error. If exactly one RS daemon is configured, then the store instance will try attach to this RS daemon. If more than one RS daemon in the RS daemon cluster is configured to run on an instance's current node, then the "LocalIndex" Replicated Store mbean attribute can be used to disambiguate.

In accordance with an embodiment, a replicated store instance can act as a client that opens one or more fixed size regions within the RS Volume that's maintained by the RS Daemons. The replicated store instance then can subsequently write data to or read data from these regions. Regions are not shared between replicated store instances—each RS instance maintains its own unique set of regions.

Replicated store instances, in an embodiment, can recycle the space that is used within the respective regions. When a replicated store instance deletes data, the memory which the data is used in the region can be made available for new data. A replicated store instance can create a new region when all of its regions are too full to accommodate new data (for example because of a growing backlog of unprocessed JMS messages). A region within the RS volume is not deleted and its backing machine memory is not freed until either (A) the entire RS daemon cluster is shut down or (B) the replicated store instance that references the region is shutdown and the region is administratively deleted.

In accordance with an embodiment, the size of a region can be configurable on a per replicated store basis via the replicated store RegionSize parameter, and the size of a region can be fixed once created. Changing the RegionSize parameter can affect future new regions that a store may create, but not existing regions.

Each region dynamically can maintain an internal length value that corresponds to the farthest written point in the region. A length can increase from zero up to the region size but does not decrease.

According to an embodiment, each replicated store instance can maintain a unique set of regions, and a region cannot be safely shared by different concurrent replicated store instances. To help guard against this possibility, each region can maintain lock files in the replicate store global directory as a guard against such concurrent access.

The above-described usage within a WebLogic environment, including the use of JMS services, is provided by way of example, to illustrate a particular embodiment. In accordance with other embodiments, the system and method can be used with other types of application server environment, cloud, or other enterprise environment.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for providing data storage in a computing environment, comprising:
   a plurality of processing nodes, wherein each processing node includes a processor and a physical memory, and executes one or more application server instances, wherein each application server instance is associated with one or more replicated stores;
   a replicated store daemon cluster, the replicated store daemon cluster comprising a plurality of replicated store daemons, including a replicated store daemon operating at and associated with each processing node, wherein each replicated store daemon provides access to the physical memory of the processing node the replicated store daemon is operating at and associated with, wherein each replicated store daemon comprises a RDMA (remote direct memory access) interface;
   two or more replicated stores, each of the two or more replicated stores being associated with a processing node of the plurality of processing nodes;
   wherein a replicated store of the two or more replicated stores at a first processing node of the plurality of processing nodes opens a fixed-size primary region on the physical memory on the first processing node, the fixed-size primary region being managed by a replicated store daemon associated with the first processing node, wherein the replicated store daemon associated with the first processing node places a lock on the fixed-size primary region;
   wherein the replicated store at the first processing node stores data in the fixed-size primary region;
   wherein the replicated store daemon associated with the first processing node is configured to persist the data to a fixed-size secondary region in a physical memory on another processing node, the physical memory on the another processing node being managed by a replicated store daemon associated with the another processing node of the plurality of processing nodes, wherein the replicated store daemon associated with the another processing node places a lock on the fixed-size secondary region;
   wherein the data is stored in the fixed-size primary region in the physical memory on the first processing node simultaneously with the data being persisted in the fixed-sized secondary region in the physical memory on the another processing node;
   wherein the fixed size primary region opened by the replicated store at the first processing node is unique to the replicated store and is not accessible by any other of the two or more replicated stores at the first processing node; and wherein the lock placed by the replicated stored daemon associated with the first processing node and the lock placed by the replicated store daemon associated with the another processing node are stored in the global directory.

2. The system of claim 1, further comprising:
a global directory, the global directory being shared by plurality of replicated store daemons;
wherein the another processing node is a nearest neighbor of the first processing node as determined by a configuration of the global directory.

3. The system of claim 2, wherein a size of the fixed-size primary region and a size of the fixed-size secondary region are the same; and
wherein the size of the fixed-size primary region and the size of the fixed-size secondary region are determined by a parameter in the global directory.

4. The system of claim 1, wherein each of the plurality of processing nodes is an Exalogic processing node.

5. The system of claim 1, wherein each of the application server instances comprises a message server, and the stored data comprises one or more messages.

6. The system of claim 1, wherein a resilvering to transparently copy the data from the fixed-size secondary region to a new fixed-size primary region on a physical memory of a third processing node of the plurality processing nodes is performed if it is determined that the first processing node has failed, the third processing node of the plurality processing nodes being associated with a third replicated store daemon;
wherein, upon the performance of transparently copying the data from the fixed-size secondary region to a new fixed-size primary region on a physical memory of the third processing node of the plurality of processing nodes, the third replicated store daemon is configured to persist the data to a new fixed-size secondary region in a physical memory on a fourth processing node, the physical memory on the fourth processing node being managed by a fourth replicated store daemon associated with the fourth processing node of the plurality of processing nodes, the fourth replicated store daemon being a nearest neighbor of the third replicated store daemon.

7. The system of claim 6, wherein after the data has been persisted to the new fixed-size secondary in a physical memory on the fourth processing node, the data is removed from the fixed-size secondary region.

8. A method for providing data storage in a computing environment, the method comprising:
executing, at a plurality of processing nodes, wherein each processing node includes a processor and a physical memory, one or more application server instances, wherein each application server instance is associated with one or more replicated stores;
providing a replicated store daemon cluster, the replicated store daemon cluster comprising a plurality of replicated store daemons, including a replicated store daemon operating at and associated with each processing node, wherein each replicated store daemon provides access to the physical memory of the processing node the replicated store daemon is operating at and associated with, wherein each replicated store daemon comprises a RDMA (remote direct memory access) interface;

two or more replicated stores, each of the two or more replicated stores being associated with a processing node of the plurality of processing nodes;
opening, by a replicated store of the two or more replicated stores at a first processing node of the plurality of processing nodes, a fixed-size primary region on the physical memory on the first processing node, the fixed-size primary region being managed by a replicated store daemon associated with the first processing node, wherein the replicated store daemon associated with the first processing node places a lock on the fixed-size primary region;
storing, by the replicated store at the first processing node, data in the fixed-size primary region; and
persisting, by the replicated store daemon associated with the first processing node, the data to a fixed-size secondary region in a physical memory on another processing node, the physical memory on the another processing node being managed by a replicated store daemon associated with the another processing node of the plurality of processing nodes, wherein the replicated store daemon associated with the another processing node places a lock on the fixed-size secondary region;
wherein the data is stored in the fixed-size primary region in the physical memory on the first processing node simultaneously with the data being persisted in the fixed-sized secondary region in the physical memory on the another processing node;
wherein the fixed size primary region opened by the replicated store at the first processing node is unique to the replicated store and is not accessible by any other of the two or more replicated stores at the first processing node; and
wherein the lock placed by the replicated stored daemon associated with the first processing node and the lock placed by the replicated store daemon associated with the another processing node are stored in the global directory.

9. The method of claim 8, further comprising:
sharing, by the plurality of replicated store daemons, a global directory;
wherein the another processing node is a nearest neighbor of the first processing node as determined by a configuration of the global directory.

10. The method of claim 9, wherein a size of the fixed-size primary region and a size of the fixed-size secondary region are the same; and
wherein the size of the fixed-size primary region and the size of the fixed-size secondary region are determined by a parameter within the global directory.

11. The method of claim 8, wherein each of the plurality of processing nodes is an Exalogic processing node.

12. The method of claim 8, wherein each of the application server instances comprises a message server, and the stored data comprises one or more messages.

13. The method of claim 8, further comprising:
performing a resilvering to transparently copy the data from the fixed-size secondary region to a new fixed-size primary region on a physical memory of a third processing node of the plurality processing nodes upon a determination that the first processing node has failed, wherein the third processing node of the plurality of processing nodes is associated with a third replicated store daemon; and
upon the performing the transparent copying the data from the fixed-size secondary region to a new fixed-size primary region on a physical memory of the third processing node of the plurality of processing nodes, the third replicated store daemon is configured to persist the data to a new fixed-size secondary region in a physical memory on a fourth processing node, the physical memory on the fourth processing node being managed by a fourth replicated store daemon associated with the fourth processing node of the plurality of processing nodes, the fourth replicated store daemon being a nearest neighbor of the third replicated store daemon.

14. The method of claim 13, wherein after the data has been persisted to the new fixed-size secondary in a physical memory on the fourth processing node, the data is removed from the fixed-size secondary region.

15. A non-transitory computer readable storage medium, including instructions stored thereon for providing data storage in a computing environment which when read and executed by one or more computers cause the one or more computers to perform the steps comprising:
  executing, at a plurality of processing nodes, wherein each processing node includes a processor and a physical memory, one or more application server instances, wherein each application server instance is associated with one or more replicated stores;
  providing a replicated store daemon cluster, the replicated store daemon cluster comprising a plurality of replicated store daemons, including a replicated store daemon operating at and associated with each processing node, wherein each replicated store daemon provides access to the physical memory of the processing node the replicated store daemon is operating at and associated with, wherein each replicated store daemon comprises a RDMA (remote direct memory access) interface;
  two or more replicated stores, each of the two or more replicated stores being associated with a processing node of the plurality of processing nodes;
  opening, by a replicated store of the two or more replicated stores at a first processing node of the plurality of processing nodes, a fixed-size primary region on the physical memory on the first processing node, the fixed-size primary region being managed by a replicated store daemon associated with the first processing node, wherein the replicated store daemon associated with the first processing node places a lock on the fixed-size primary region;
  storing, by the replicated store at the first processing node, data in the fixed-size primary region; and
  persisting, by the replicated store daemon associated with the first processing node, the data to a fixed-size secondary region in a physical memory on another processing node, the physical memory on the another processing node being managed by a replicated store daemon associated with the another processing node of the plurality of processing nodes, wherein the replicated store daemon associated with the another processing node places a lock on the fixed-size secondary region;
  wherein the data is stored in the fixed-size primary region in the physical memory on the first processing node simultaneously with the data being persisted in the fixed-sized secondary region in the physical memory on the another processing node; and
  wherein the fixed size primary region opened by the replicated store at the first processing node is unique to the replicated store and is not accessible by any other of the two or more replicated stores at the first processing node; and
  wherein the lock placed by the replicated stored daemon associated with the first processing node and the lock placed by the replicated store daemon associated with the another processing node are stored in the global directory.

16. The non-transitory computer readable storage medium of claim 15, the steps further comprising:
  sharing, by the plurality of replicated store daemons, a global directory;
  wherein the another processing node is a nearest neighbor of the first processing node as determined by a configuration of the global directory.

17. The non-transitory computer readable storage medium of claim 16, wherein a size of the fixed-size primary region and a size of the fixed-size secondary region are the same; and
  wherein the size of the fixed-size primary region and the size of the fixed-size secondary region are fixed by a parameter within the global directory.

18. The non-transitory computer readable storage medium of claim 15, wherein each of the plurality of processing nodes is an Exalogic processing node.

19. The non-transitory computer readable storage medium of claim 15, wherein each of the application server instances comprises a message server, and the stored data comprises one or more messages.

20. The non-transitory computer readable storage medium of claim 15, the steps further comprising:
  performing a resilvering to transparently copy the data from the fixed-size secondary region to a new fixed-size primary region on a physical memory of a third processing node of the plurality processing nodes upon a determination that the first processing node has failed, wherein the third processing node of the plurality of processing nodes is associated with a third replicated store daemon; and
  upon the performing the transparent copying the data from the fixed-size secondary region to a new fixed-size primary region on a physical memory of the third processing node of the plurality of processing nodes, the third replicated store daemon is configured to persist the data to a new fixed-size secondary region in a physical memory on a fourth processing node, the physical memory on the fourth processing node being managed by a fourth replicated store daemon associated with the fourth processing node of the plurality of processing nodes, the fourth replicated store daemon being a nearest neighbor of the third replicated store daemon.

* * * * *

UNITED STATES PATENT AND TRADEMARK OFFICE
CERTIFICATE OF CORRECTION

PATENT NO. : 10,455,019 B2
APPLICATION NO. : 14/849262
DATED : October 22, 2019
INVENTOR(S) : Barnes et al.

Page 1 of 1

It is certified that error appears in the above-identified patent and that said Letters Patent is hereby corrected as shown below:

In the Claims

In Column 15, Line 48, in Claim 7, delete "secondary" and insert -- secondary region --, therefor.

In Column 16, Line 30, in Claim 8, delete "fixed size" and insert -- fixed-size --, therefor.

In Column 17, Line 13, in Claim 14, delete "secondary" and insert -- secondary region --, therefor.

In Column 18, Line 6, in Claim 15, delete "fixed size" and insert -- fixed-size --, therefor.

Signed and Sealed this
Twenty-third Day of February, 2021

Drew Hirshfeld
*Performing the Functions and Duties of the*
*Under Secretary of Commerce for Intellectual Property and*
*Director of the United States Patent and Trademark Office*